(12) United States Patent
Riley et al.

(10) Patent No.: US 7,751,676 B2
(45) Date of Patent: Jul. 6, 2010

(54) CABLE ENTRY SEAL

(75) Inventors: Mike C. Riley, Raleigh, NC (US); Anthony P. Noto, Knightdale, NC (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 11/940,114

(22) Filed: Nov. 14, 2007

(65) Prior Publication Data

US 2008/0118216 A1    May 22, 2008

Related U.S. Application Data

(60) Provisional application No. 60/866,890, filed on Nov. 22, 2006.

(51) Int. Cl.
*G02B 6/00*    (2006.01)

(52) U.S. Cl. .................. 385/138; 174/564; 277/609; 277/614; 277/627

(58) Field of Classification Search .................. 174/657
See application file for complete search history.

(56) References Cited

U.S. PATENT DOCUMENTS

| 4,842,364 A | 6/1989 | Chen |
| 6,211,465 B1 * | 4/2001 | Streit .......................... 174/653 |
| 2004/0009713 A1 * | 1/2004 | Weise et al. .................. 439/721 |

* cited by examiner

*Primary Examiner*—Uyen-Chau N Le
*Assistant Examiner*—Chad H Smith
(74) *Attorney, Agent, or Firm*—RG & Associates LLC

(57) ABSTRACT

A seal assembly is provided to seal the area between a cable, containing optic fibers for example, and the terminal end of a conduit through which the cable runs. The seal assembly comprises an area of a resilient material and a supporting structure. The seal assembly, encompassing a cable, fits into and seals a standard conduit opening/hole in a cabinet or enclosure.

9 Claims, 2 Drawing Sheets

CABLE ENTRY SEAL

CLAIMING BENEFIT OF PRIOR FILED U.S. APPLICATION

This application claims the benefit of U.S. Provisional Application Ser. No. 60/866,890 filed on Nov. 22, 2006. The contents of this document are hereby incorporated by reference herein.

FIELD OF THE INVENTION

The present invention relates to improvements to apparatuses and methods for forming a seal around cables that are passed through an opening of a sealed enclosure.

BACKGROUND OF THE INVENTION

Cables and particularly fiber optic cables have become a preferred transmission system for telecommunication and data communication. Fiber optic cables, for example, can contain many strands of optic fibers. These cables are generally installed underground inside a conduit. The conduit and the cable that runs through it are often laid in trenches and can extend for long distances. For purposes of maintenance, upgrading, and connection to the fiber optics, underground vaults are installed strategically along the path of the conduit and cable. Many cables and conduits may terminate or run through these vaults or other similar compartments. When a conduit terminates, but the cable continues its run, it is desirable to provide a seal between the cable and the conduit at the termination of the conduit.

A technical problem solved with the present invention is that fiber and/or copper cables need to enter an environmentally protected electronics enclosure. Their entry point must not compromise the environmental seal. The main issues are typically protection from Wind Driven Rain (WDR—hurricane type) and insects.

There are a number of solutions; however, none that meet all needs. For example:

One type is the rubber grommet. It typically is made of a rubber membrane that needs to be sliced to allow cable passage. The membrane does seal the cable entry to some extent, but not well enough to keep tiny insects out or WDR that may ride up the cables. To insure a proper seal, users add a liquid sealant such as RTV/caulking to completely seal these grommets.

The more waterproof type only allows the cable to pass through. This does not work for cables that are pre-terminated/connectorized as are some in our case.

A particular example of the art is described in U.S. Pat. No. 4,842,364. In this case, the seal is formed by a gasket and supporting structure. The gasket and its supports can slide axially over the cable and into the conduit. However, this is not the case if the end of the cable is not accessible. In this case the gasket and its supports must be split or halved in order to surround the cable. The device described requires intricate fabrication techniques that utilize split threaded devices used for producing compression force on a gasket, thus causing the gasket to expand. The threaded nut is made in two halves and must be assembled around the cable. During fabrication of this nut, significant effort must be given to the correct timing of the threads so that when assembled the mating halves will produce a continuous thread. Assembly of the split halves can be difficult. In this prior art, the majority of the assembly of the seal occurs at the installation site, in the confines of an underground vault, which is difficult because the pieces are small and intricate. If the threaded parts are made of plastic, the tooling to produce these parts is intricate, complicated, and expensive. The amount of compression of the gasket in this and possible other prior art is dependent on how tightly threaded members are torqued. Since this torque is generally uncontrolled in the field, large forces may be transmitted which may damage the conduit and/or cable. Conversely, if too little torque is applied, the gasket may not seal as intended. Further, some prior art device use metal fasteners as part of the scheme to compress a gasket. Metal may corrode after time. These designs are optimized for water submersion and sealing individual cables. They do not seal well around more than one cable due to the required durometer of the gasket. In addition, the structure of the mechanism has to fit within the conduit severely restricting the size opening available for cable or cable with connector.

Accordingly, there remains a need for an improved device which can be easily installed around a fiber optic and/or copper cables before or after installation of the cables and can be as easily removed, and which has no corrodible components. Such a device limited tools to install and remove, and should be inexpensive, durable and efficient in sealing the cable from foreign substances.

SUMMARY OF THE INVENTION

Accordingly, it is the object of this invention to provide a simple, cost effective means to seal the area around a cable and the conduit in which the cable resides. The advantages can include: (a) ease of installation, (b) low cost, (c) complete assembly ease prior to installation, (d) controlled force that is transmitted to the cable and conduit, (e) improved sealing between cable and conduit, (f) resistance to chemicals in its environment, and (g) inherent corrosion resistance.

Still further objectives and advantages will become apparent from a consideration of the ensuing description.

DETAILED DESCRIPTION

Figure 1A:
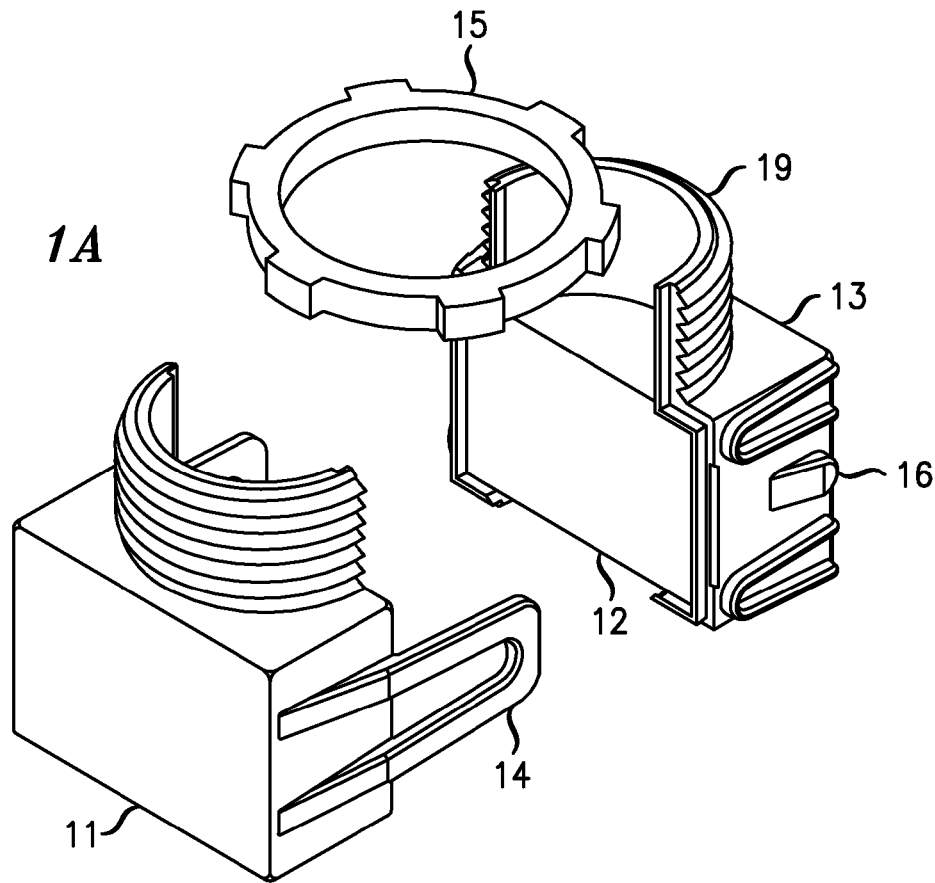
FIG. 1A shows a view of a cable entry seal device in an engaged position according to an embodiment of the present invention.
Figure 1B:
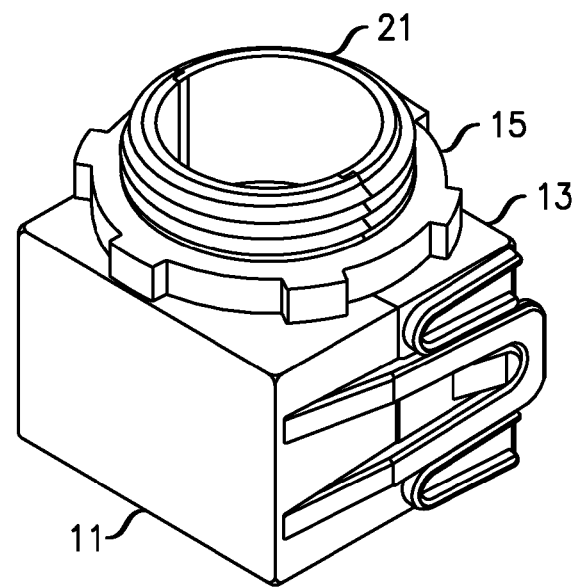
FIG. 1B shows a view of a cable entry seal device in an unengaged position according to an embodiment of the present invention.

Now referring to FIGS. 1A-1B of the drawings, a first embodiment of the present invention is schematically depicted therein.

The seal assembly is a sandwich or squeeze box seal design that can be placed over a cable and snapped/connected together around it. A connected seal assembly is shown in FIG. 1B. The two halves 11, 13 have some form of foam rubber or similar resilient material 12 that wraps around the cable(s), which pass through the nut 15 and between the halves 11, 13, when compressed by the two halves 11, 13 coming together. The material is contained in each half 11, 13 and can be made from one or several layers and even pre-shaped if necessary. The closed unit 20 then fits into and seals a standard conduit opening/hole in a cabinet or enclosure and is fixed to the cabinet by the nut 15 and threading 21. For an existing terminated cable, the nut currently applied around the cable is reused so that it is not required to disconnect the terminated cable. Standard size for the nut 15 and threading 21 is from the Approved American National Standard (ANSI) for electrical rigid conduit. This design lends itself to be used on any enclosure design that has standard conduit openings. Once tightened to the opening using a standard conduit fitting nut 15, the unit 20 cannot be opened without loosening the nut 15. This ensures less possibility for someone to tamper with the seal.

Now referring more particularly to FIG. 1A, the seal assembly 20 is shown in unassembled components. Each half of the assembly 11, 13 includes half of the standard threadings 17, 19 of the connected assembly thread 21 so when snapped/connected together a standard size nut can be screwed thereon. Each half 11, 13 can be made from plastic, metal, or any other ridged material. The two halves 11, 13 are held together by a snap assembly 14, 16. One of the halves 11 includes a pair of flexible arms 14 connected on opposing sides of the half 11 and which extend therefrom. The other half 13 includes a pair of bosses 16 connected on opposing sides of half 13 and adapted for engagement with the flexible arms 14. When the two halves are compressed together, the flexible arms 14 snap over the bosses 16. Thereafter, the nut 15 can be screwed onto the combined threadings 17, 19.

Figure 2A:
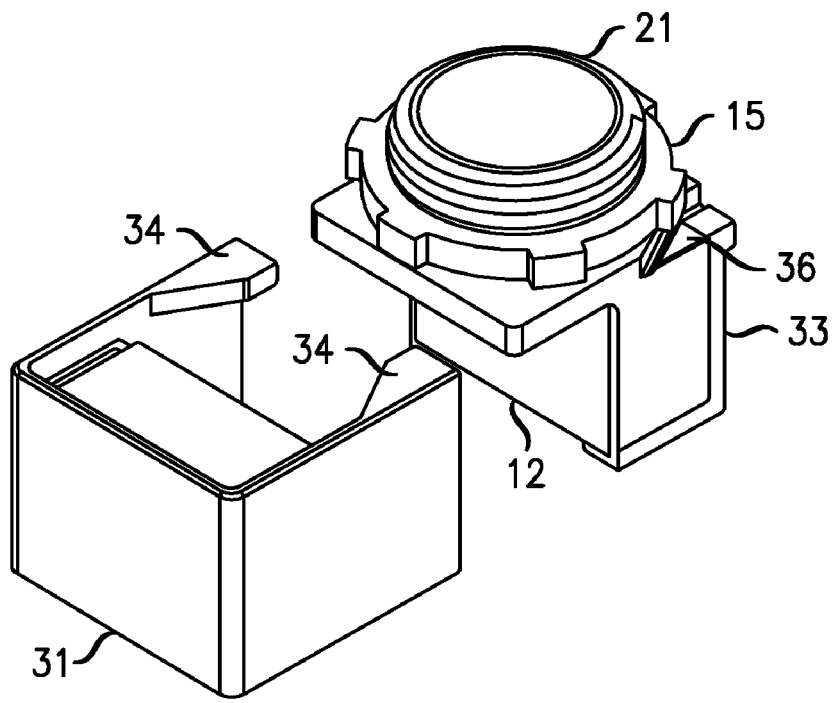
FIG. 2A shows a view of a cable entry seal device in an engaged position according to another embodiment of the present invention.
Figure 2B:
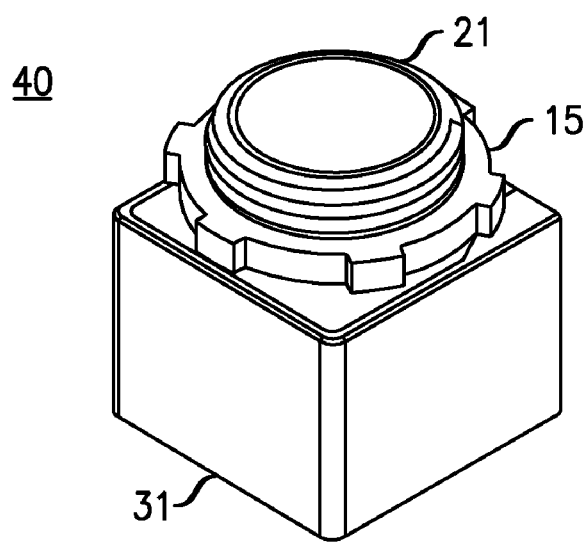
FIG. 2B shows a view of a cable entry seal device in an unengaged position according to another embodiment of the present invention.

FIGS. 2A-2B illustrates another embodiment of the present invention. FIG. 2B shows a connected seal assembly 40 is shown in FIG. 1B. The two halves 31, 33 have some form of foam rubber or similar resilient material 12 that wraps around the cable(s), which pass through the nut 15 and between the halves 31, 33, when compressed by the two halves 31, 33 coming together. The material 12 is contained in each half 33, 33 and can be made from one or several layers and even pre-shaped if necessary. The closed unit 40 then fits into and seals a standard conduit opening/hole in a cabinet or enclosure and is fixed to the cabinet by the nut 15 and threading 21. Again, the standard size for the nut 15 and threading 21 is from the Approved American National Standard (ANSI) for electrical rigid conduit.

Now referring more particularly to FIG. 1A, the seal assembly 20 is shown in unassembled components. Each half of the assembly 11, 13 includes half of the standard threadings 19 and a similar portion on top of the assembly 11, of the connected assembly thread 21 so when snapped/connected together a standard size nut can be screwed thereon. Each half 11, 13 can be made from plastic, metal, or any other ridged material. The two halves 11, 13 are held together by a snap assembly 14, 16. One of the halves 11 includes a pair of flexible arms 14 connected on opposing sides of the half 11 and which extend therefrom. The other half 13 includes a pair of bosses 16 connected on opposing sides of half 13 and adapted for engagement with the flexible arms 14. When the two halves are compressed together, the flexible arms 14 snap over the bosses 16. Thereafter, the nut 15 can be screwed onto the combined threadings 19 and the similar portion on top of the assembly 11.

The embodiments of the present invention can be differentiated from existing solutions in that it is a fast, very inexpensive way to get a watertight seal while still having the ability to use pre-terminated cables.

Some available solutions are time consuming in that they require a liquid sealant which also makes re-entry messy where the present invention requires no liquid sealant. Many of these must be custom designed for the specific application. Prior styles do not allow pre-terminated, or bundled, cables and therefore are not an option where the present invention allows for pre-terminated or bundled cables. Others also require special bulkhead designs or split openings rather than standard conduit sized holes where the present invention is designed for a standard conduit opening.

Various other modifications, changes, alterations and additions can be made in the improved assembly of the present invention. All such modifications, changes, alterations and additions as are within the scope of the appended claims form part of the present application.

What is claimed is:

1. A seal assembly for providing a water tight region at the entry enclosure and around cable that passed therethrough, the seal assembly comprising: a first half supporting structure including half of an American standard rigid conduit supporting thread positioned on top of a portion of the first half supporting structure and further including a seal region adjacent to the thread, wherein the seal region comprises a first cavity, and a resilient material that substantially fills the first cavity, the first half supporting structure still further including a connecting structure; and a second half supporting structure including half of an American standard rigid conduit supporting thread positioned on top of a portion of the second half supporting structure and further including a seal region adjacent to the thread, wherein the seal region comprises a second cavity, and the resilient material that substantially fills the second cavity, the second half supporting structure still further including another connecting structure for engagement with the connecting structure of the first half supporting structure, wherein the sealing regions of the first half supporting structure and the second half supporting structure have parallel surfaces which abut when the first half supporting structure and the second half supporting structure are connected via the respective connecting structures.

2. The seal assembly of claim 1, wherein the resilient material in each half comprises at least one layer of rubber material.

3. The seal assembly of claim 1, wherein the resilient material in each half comprises more than one layer of rubber material.

4. The seal assembly of claim 1, wherein the resilient material in each half is pre-shaped.

5. The seal assembly of claim 1, wherein the seal assembly is adapted to fit into and to seal a standard conduit opening of an enclosure.

6. The seal assembly of claim 1, wherein when the first half supporting structure and the second half supporting structure are coupled together, the two halves are adapted to be tightened by means of a standard conduit fitting nut.

7. The seal assembly of claim 6, wherein the standard conduit fitting nut is defined by the Approved American National Standard (ANSI) for electrical rigid conduit.

8. The seal assembly of claim 1, wherein the connecting structure of the first half supporting structure includes a pair of flexible arms connected on opposing sides of the first half supporting structure and which extend perpendicular from the seal region.

9. The seal assembly of claim 8, wherein the connecting structure of the second half supporting structure includes a pair of bosses connected on opposing sides of the second half supporting structure for engagement with the flexible arms.

* * * * *